United States Patent [19]

Dearman

[11] Patent Number: 5,040,754
[45] Date of Patent: Aug. 20, 1991

[54] REFUSE COLLECTOR

[76] Inventor: Timothy C. Dearman, P.O. Box 737, Mansfield, Tex. 76063

[21] Appl. No.: 419,027

[22] Filed: Oct. 10, 1989

[51] Int. Cl.$^5$ ............................................. A63B 55/04
[52] U.S. Cl. .................................... 248/97; 15/257.4; 248/98; 248/907
[58] Field of Search ...................... 248/97, 98, 95, 907; 220/404; 15/257.4, 257.9, 257.7

[56] References Cited

U.S. PATENT DOCUMENTS

| | | | |
|---|---|---|---|
| 422,274 | 2/1890 | Wilkinson | 248/98 |
| 2,835,501 | 5/1958 | Chamberlin et al. | 248/98 |
| 2,890,060 | 6/1959 | Ott et al. | 248/98 |
| 3,106,303 | 10/1963 | Finocchiaro . | |
| 3,697,030 | 10/1972 | Schultz . | |
| 3,934,803 | 1/1976 | Paulus, Jr. . | |
| 4,006,928 | 2/1977 | Beugin . | |
| 4,160,557 | 7/1979 | Taylor | 248/98 X |
| 4,185,403 | 1/1980 | Hardgrove | 15/257.1 X |
| 4,238,868 | 12/1980 | Sternberg . | |
| 4,280,676 | 6/1981 | Betts | 248/97 |
| 4,334,660 | 6/1982 | Zeigler | 248/97 |
| 4,357,728 | 11/1982 | Pravettone . | |
| 4,442,567 | 4/1984 | Pravettone | 248/98 X |
| 4,749,158 | 6/1988 | BUckley | 248/98 |
| 4,802,258 | 2/1989 | Jensen . | |
| 4,917,393 | 4/1990 | Rogers | 248/98 X |

FOREIGN PATENT DOCUMENTS

| | | | |
|---|---|---|---|
| 1108917 | 1/1956 | France | 15/257 |
| 12235 | of 1848 | United Kingdom | 248/98 |

Primary Examiner—Gary L. Smith
Assistant Examiner—Michael J. Milano
Attorney, Agent, or Firm—Learman & McCulloch

[57] ABSTRACT

A refuse collector comprises a wheeled frame at one end of which is a hoop which supports a pliable cylindrical sleeve that is open at both of its ends. The hoop also is adapted to support a trash bag open at one end, the trash bag being accommodated within the sleeve. The handle is coupled to the hoop and is pivotable between a first position in which it extends in prolongation of the hoop and a second position in which it generally parallels the frame. In the first position the handle enables the user to move the frame along the ground with the open end of the trash bag in condition to receive litter and in the second position of the handle it provides a support for the frame in such manner as to maintain the trash bag and its contents in an upright position.

18 Claims, 3 Drawing Sheets

REFUSE COLLECTOR

This invention relates to apparatus especially adapted for use in the collection of refuse and more particularly to a wheeled frame which provides support for a conventional trash bag, the frame having a handle movable between a first position in which it enables the user to move the frame and the trash bag supported thereby along the ground at a level to permit refuse to be swept into the trash bag and a second position in which the trash bag and its contents are supported in an upright, stable position.

BACKGROUND OF THE INVENTION

It is conventional to utilize a plastic bag for the collection of refuse, the bag being sufficiently pliable to enable its normally open end to be closed and maintained in closed position following filling of the bag to a desired level. One of the difficulties in using such a trash bag is that the bag has insufficient strength to be maintained in an upright position without external support. It has been proposed heretofore, therefore, to provide an upright frame having a loop at its upper end to which can be secured the open end of the trash bag to maintain the latter in an upright position. Such a frame, however, is not intended to enable a person to move the frame and bag along a littered path to enable refuse to be collected in the bag. Instead, it has been the practice for a person to carry a trash bag and try to keep the mouth open as the littered path is traversed. Attempting to maintain the mouth of a conventional plastic trash bag open is difficult enough in an indoors environment, and is practically impossible outdoors when the bag is subjected to a breeze or wind.

Conventionally a person seeking to fill an open trash bag must bend over or stoop, pick up the litter, and thrust it into the open end of the trash bag. Alternatively, some litter collectors use a pointed rod to impale a piece of litter without the user's having to bend over or stoop. However, removal of the piece of litter from the rod usually necessitates stripping the litter from the rod manually, thereby requiring the use of both hands and compounding the problem of maintaining the trash bag open. In either event, manual handling of the litter is an unpleasant and sometimes hazardous task which preferably is avoided.

When a trash bag is filled with litter, it is necessary in conventional constructions to lift the filled bag from the frame so as to enable another, empty bag to be fitted to the frame. In many instances the bag cannot be secured in closed position until it has been separated from the frame and in other instances the filled bag and its contents are quite heavy. In those instances in which the bag must be removed from the frame before the bag can be closed, the handling of a heavy bag often results in rupturing of the bag or otherwise spilling its contents. In any event, the necessity of having to lift a heavy bag in many instances is unduly burdensome.

An object of the invention is to provide a refuse collector which overcomes or greatly minimizes all of the foregoing disadvantages of apparatus used heretofore.

SUMMARY OF THE INVENTION

A refuse collector constructed in accordance with a preferred embodiment of the invention comprises a frame having wheels at one end and a hoop at its opposite end which is movable from a position generally alongside the frame to a position substantially normal to the frame. Secured to the hoop is a sleeve that is open at both of its ends and which is of such size as freely to accommodate a plastic trash bag therein. One end of the trash bag is closed, as is conventional, whereas its opposite end is open. The open end of the bag may be secured to the hoop so as to maintain such end of the bag open for the accommodation of litter.

A handle is pivotally secured to the hoop and is movable from a position substantially in prolongation of the hoop to another position at an angle thereto and in which the handle cooperates with the frame to support the trash bag in an upright, stable position.

The frame may be placed in a position in which it extends alongside the ground and is supported by the wheels. The mouth of the trash bag will be maintained open by the hoop and the frame may be moved along the ground by means of the handle. The frame supports a ramp adjacent the open end of the bag which may be placed in close proximity to the ground, thereby enabling litter to be swept from the ground, up the ramp, and into the open bag without necessitating manual handling of the litter.

When the trash bag has been filled to a desired level, the frame may be swung to position the trash bag in an upright condition. The handle then may be swung to a position in which it engages the ground and cooperates with the frame to support both the frame and the trash bag upright. The upper end of the bag may be removed from the hoop and its open end tied closed while the bag remains within the confines of the sleeve. Thereafter, the frame may be lifted so as to enable the trash bag and its contents to pass out of the sleeve through the lower, open end of the latter.

The hoop, the handle, and the ramp may be swung to positions in which the frame and sleeve are collapsed, thereby minimizing the space required to store or transport the apparatus.

THE DRAWINGS

A preferred embodiment of the invention is illustrated in the accompanying drawings, wherein FIG. 1 is a side elevational view, partly in section, illustrating the apparatus when it is conditioned for use;

DETAILED DESCRIPTION

Figure 1:
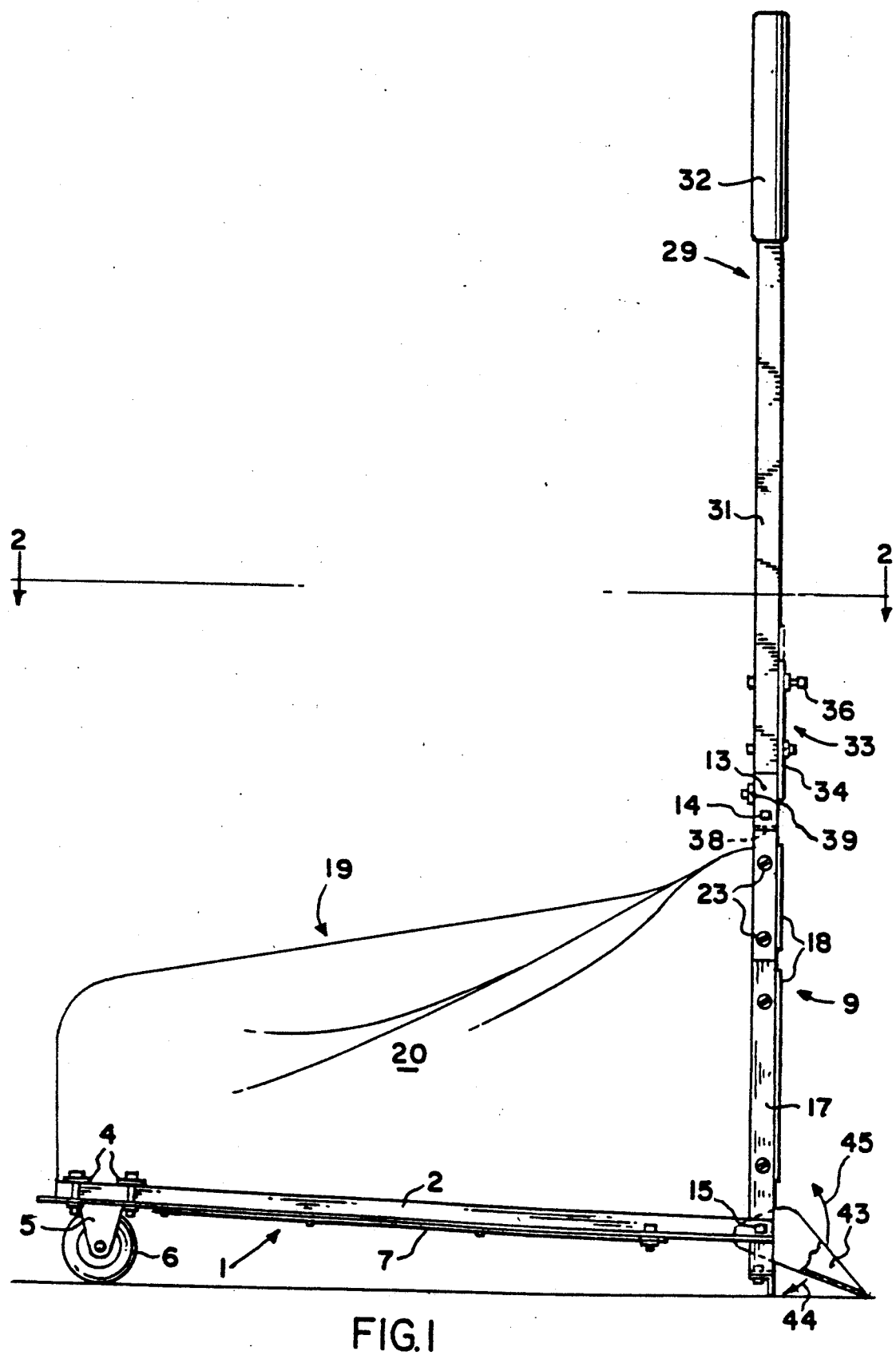
Figure 2:
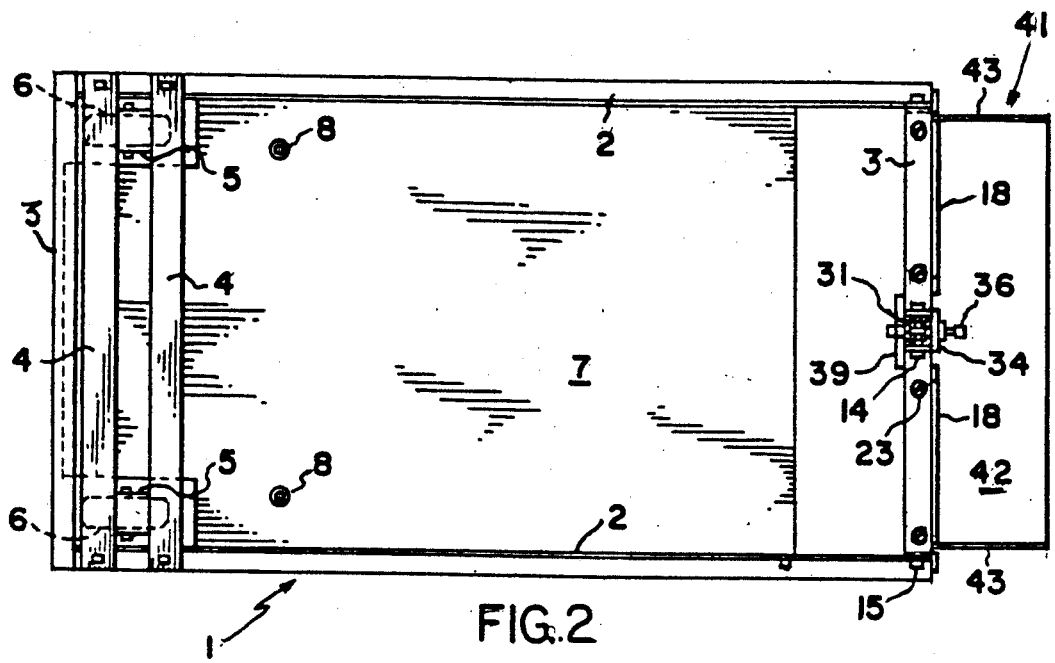
FIG. 2 is a transverse sectional view taken on the line 2—2 of FIG. 1, but with the sleeve and trash bag removed.
Figure 3:
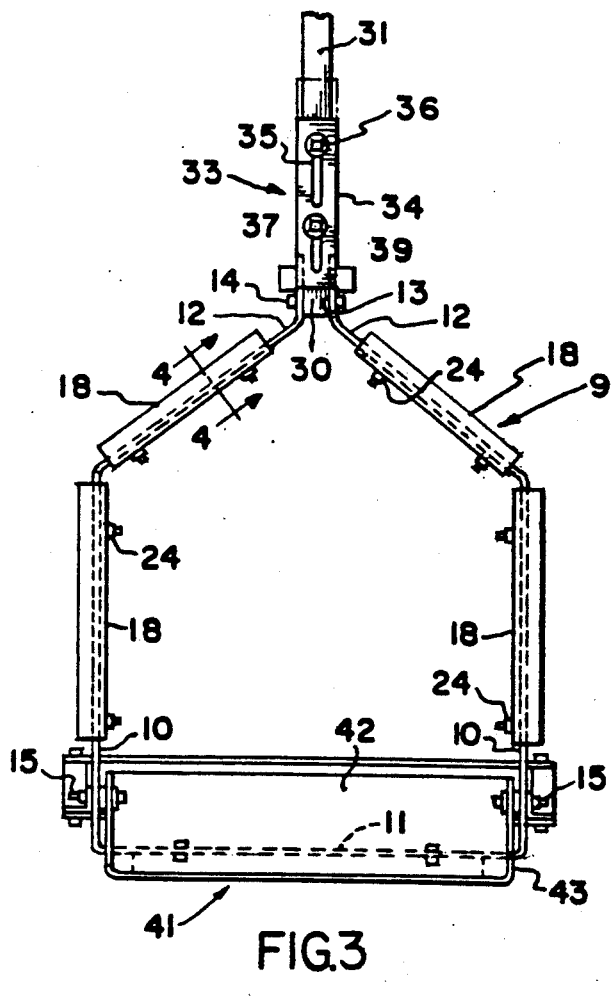
FIG. 3 is an end elevational view taken from the right-hand end of FIG. 1.

A refuse collector constructed in accordance with the disclosed embodiment of the invention comprises a frame 1 having parallel side members 2 joined at their opposite ends by cross members 3. Reinforcing bars 4 span the side members 2 adjacent one end of the frame 1. The reinforcing members support clevises 5 on which ground engageable wheels 6 are journalled. Preferably, the frame members 2 and 3 are spanned by a flat support sheet 7 for a purpose presently to be explained. The sheet 7 is provided with snap fastener halves 8 of known construction.

At that end of the frame 1 remote from the wheels 6 is a hoop 9 having a pair of spaced, parallel side bars 10 joined at corresponding ends by a cross bar 11. The opposite ends of the side bars 10 are joined to extensions 12 which converge toward one another and terminate in parallel arms 13 which are connected to one another by a pin 14. The hoop is pivotally coupled to the side bars 2 of the frame 1 by pivot pins 15.

Each of the hoop members 10, 11, and 12 is flanked by inner and outer clamp bars 16 and 17 respectively, each of the inner clamp bars having a flange 18 which overlies and projects outwardly beyond the outer bar 17. An elongate, pliable sleeve 19 has a wall 20 whose upper end is folded over the adjacent hoop members 10-12 to form parallel sections 21 and 22 interposed between the associated hoop member and the adjacent clamp bars. Headed bolts 23 and nuts 24 securely, but removably, clamp the upper edge of the sleeve 19 in assembled relation with the hoop.

Figure 4:
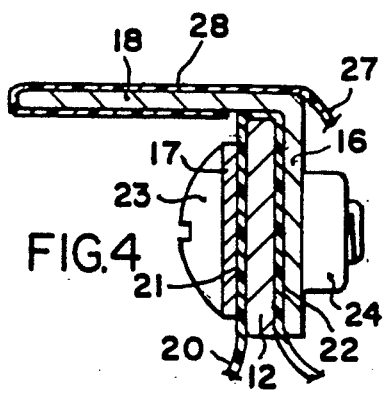
FIG. 4 is an enlarged, sectional view taken on the line 4—4 of FIG. 3.

The sleeve 19 is generally cylindrical in configuration and is of such diameter as freely to accommodate a conventional plastic trash bag 25 having a bottom 26, and a side wall 27 the upper end 28 of which may be fitted around the flanges 18 of the Clamp bars 16 as is best shown in FIG. 4. If necessary or desirable, alligator or other appropriate, removable clamps (not shown) may be used to retain the upper edge of the trash bag 25 securely in place on the flanges 18.

The trash bag 25 is a conventional, thin wall, pliable bag open at one end. The sleeve 19, however, is open at both ends and is formed of a rugged, long wearing plastic material such as woven polypropylene.

The apparatus includes a handle 29 one end 30 of which is accommodated between the parallel arms 13 of the hoop and pivotally connected thereto by the pin 14. The handle has an elongate stem 31 terminating at its free end in a tubular grip 32 formed of a highly frictional material such as rubber or the like. The length of the handle 29 preferably is 2-4 inches longer than the frame 1.

Figure 5:
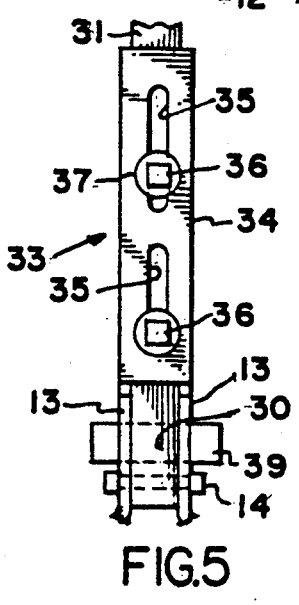
FIG. 5 is a fragmentary, enlarged, elevational view of a handle latch.

Latch means 33 is provided for releasably latching the handle 29 in a position in which it extends substantially in prolongation of the hoop 9. The latch means comprises a slideable plate 34 having a pair of slots 35 therein through which extend headed pins 36 that are anchored to the handle stem 31. Washers 37 are accommodated between the heads of the pins 36 and the adjacent surface of the slide 34. When the slide 34 is in a position in which it overlies the joint 38 (FIG. 1) between the handle stem 31 and the hoop extensions 13, it cannot be rocked counterclockwise from a position shown in FIG. 1. However, when the slide 34 is in the position shown in FIG. 5, the handle can be rocked counterclockwise from the position shown in FIG. 1 toward the position shown in FIG. 6.

To limit movement of the handle 29 in the clockwise direction from the position shown in FIG. 1, the handle is provided with a stop 39 that is engageable with the hoop extensions 13.

The apparatus preferably includes a ramp 41 carried by the frame 1 adjacent the hoop 9. The ramp comprises a plate 42 which spans the distance between the hoop members 10 and is provided with upstanding side walls 43 which are pivoted to the members 10 by the same pivot pins 15 referred to earlier. The ramp 41 thus is capable of being rocked about the axes of the pivot pins 15 as is indicated by the arrows 44 and 45 in FIG. 1 between one position in which the ramp forms a bridge to the interior of the trash bag 25 and another position in which the ramp partially overlies the open end of the trash bag.

To condition the apparatus for operation an empty trash bag 25 is placed within the sleeve 19 with the open end of the bag adjacent the hoop 9. The upper edge of the bag 25 is fitted to the hoop so as to maintain the bag open. The handle 29 then may be fixed in the position shown in FIG. 1 so as to enable the assembly to be rocked to a position in which the frame 1 substantially parallels the ground. The user may grasp the handle 29 and walk along the ground with the wheels 6 rolling upon the ground. When litter is encountered, the hoop end of the frame may be lowered so that the ramp 41 rests upon the ground, whereupon the user may use a broom to sweep litter from the ground up the ramp into the bag 25. Thus, the user is not required to handle the litter manually.

Figure 6:
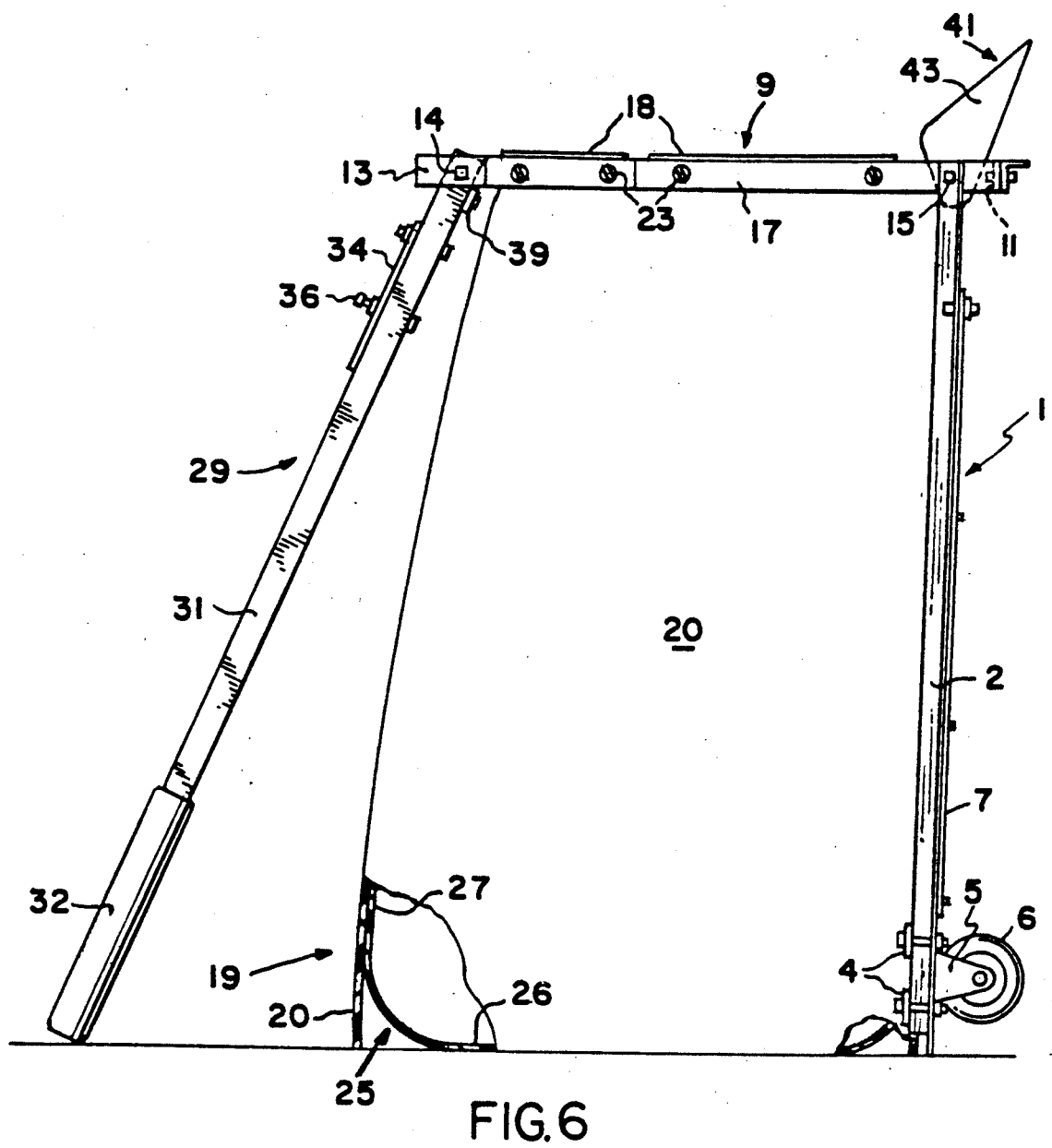
FIG. 6 is an elevational view, partly in section, illustrating the apparatus in an upright condition.

When the bag 25 is suitably filled, the frame may be rocked to the position shown in FIG. 6 in which the trash bag 25 is upright. The slide 34 of the latch 33 then may be moved toward the free end of the handle, thereby enabling the latter to be rocked to a position generally parallel to but spaced from the frame and in which the free end of the handle bears upon the ground and provides support for the frame to maintain the latter upright In this position of the frame the upper edge of the trash bag 25 may be removed from the hoop, closed, and tied. Thereafter, the frame may be lifted upwardly thereby enabling the bag to be removed from the sleeve 19 through its open, lower end. The combined weight of the frame, the hoop, and the handle preferably is not more than five pounds, thereby enabling the frame to be lifted quite easily. In many instances, the weight of the trash bag 25 and its contents will be several times the weight of the frame. Thus, separation of the trash bag and the frame by lifting the frame, rather than the trash bag, is easier than lifting the bag.

Preferably, the sleeve 19 has secured thereto companion snap fasteners (not shown) which register with the fasteners 8 on the frame and cooperate therewith to provide additional means for releasably securing the sleeve to the frame and minimize the possibility that the sleeve will become skewed relative to the frame.

When the frame occupies a position generally parallel to the ground the ramp 41 may be rocked about the pivot pins 15 to a position in which it partially overlies the open end of the trash bag and thereby minimizes the possibility that litter may escape from the bag.

When the apparatus is not in use the hoop 9 may be rocked about the pivot pins 15 to occupy a collapsed position generally alongside the frame 1. The pliability of the sleeve 19 enables the latter to be collapsed. Thus, the apparatus may assume a compact condition for storage or transport.

This disclosure is representative of a presently preferred embodiment of the invention, but is intended to be illustrative rather than definitive thereof. The invention is defined in the claims.

I claim:

1. A refuse collector comprising a frame; ground engageable means carried by said frame adjacent one end thereof; a hoop member; means joining said hoop member to said frame adjacent its other end, said hoop member being of such size as to enaable a trash bag open at one end to be supported by said member with said one end of said bag being maintained open by said hoop member; an elongate handle; and means coupling one end of said handle to said hoop member for swinging movements of said handle between a first position in which said handle extends generally in prolongation of said hoopmember and a second position in which said handle extends generally parallel to but spaced from said frame, said frame being movable between a generally horizontal position and a generally upright position, said handle being of such length that when said handle is in said second position that end of the handle opposite said one end is engageable with the ground to support said frame in said upright position.

2. A refuse collector according to claim 1 including a sleeve carried by said hoop member for encircling said bag.

3. A refuse collector according to claim 2 wherein said sleeve comprises a cylinder open at both of its ends.

4. A refuse collector according to claim 1 including releasable means for separably securing said sleeve to said frame.

5. A refuse collector according to claim 1 including a ramp connected to said frame adjacent said one end thereof.

6. A refuse collector according to claim 5 wherein said ramp is pivoted to said frame for swinging movements relative thereto.

7. A refuse collector according to claim 1 wherein said coupling means is pivotal.

8. A refuse collect or according to claim 1 including latch means for latching said handle in said first position.

9. A refuse collector according to claim 1 wherein the means joining said hoop member to said frame member is pivotal enabling said hoop member to occupy a first position alongside said frame member and a second position extending away from said frame member.

10. A refuse collector according to claim 1 wherein said ground engageable means comprise wheels.

11. A refuse collector comprising a frame having first and second ends; a hoop member; means joining said hoop member to said frame at said first end thereof; a sleeve secured at one end to said hoop member and extending alongside said frame in engagement therewith, said sleeve being maintained open at one end thereof by said hoop member, said sleeve being of such size as to accommodate therein a trash bag open at one end thereof corresponding to said one end of said sleeve; an elongate handle; and means coupling said handle at one end thereof to said hoop member for swinging movements of said handle relative to said hoop member between a first position in which said handle extends generally in prolongation of said hoop member and a second position in which said handle extends generally parallel to said frame and at an angle to said hoop member, said handle being of such length that when said handle is in said second position said handle is cooperable with said sec on end of said frame to support said frame and sleeve in a generally upright position with said hoop member uppermost.

12. A refuse collector according to claim 11 wherein said frame include a support for said sleeve.

13. A refuse collector according to claim 11 including releasable means for securing said sleeve to said frame member.

14. A refuse collector according to claim 11 wherein said sleeve is open at its other end.

15. A refuse collector according to claim 11 including wheels mounted on said frame member at its second end.

16. A refuse collector according to claim 11 including a ramp connected to said frame adjacent said first end thereof.

17. A refuse collector according to claim 16 wherein said ramp is pivoted to said frame for swinging movements relative thereto.

18. A refuse collector according to claim 11 including latch means for latching said handle in said first position.

* * * * *

UNITED STATES PATENT AND TRADEMARK OFFICE
CERTIFICATE OF CORRECTION

PATENT NO. : 5,040,754
DATED : August 20, 1991
INVENTOR(S) : Timothy C. Dearman

It is certified that error appears in the above-identified patent and that said Letters Patent is hereby corrected as shown below:

Column 2, line 27, after "which" cancel the period.

Column 3, line 24, change "Clamp" to -- clamp --.

Column 4, line 6, change "and" to -- end --; line 27, after "upright" insert a period.

Column 5, line 28, change "collect or" to -- collector --.

Column 6, line 17, change "sec on" to -- second --; line 21, change "include" to -- includes --.

Signed and Sealed this

Tenth Day of November, 1992

Attest:

DOUGLAS B. COMER

*Attesting Officer*  *Acting Commissioner of Patents and Trademarks*